May 27, 1924.
C. H. WEISKOPF
1,495,363
APPARATUS FOR ELECTRICAL PRECIPITATION OF SUSPENDED PARTICLES FROM GASES
Filed Dec. 8, 1920        2 Sheets-Sheet 1
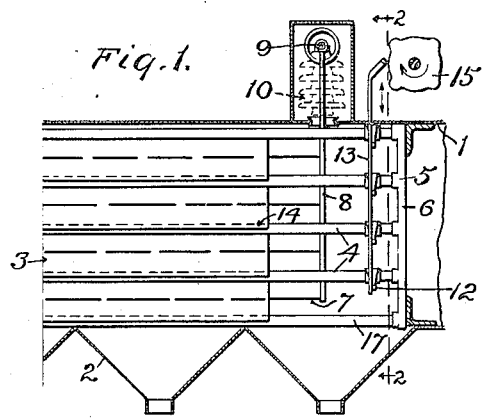
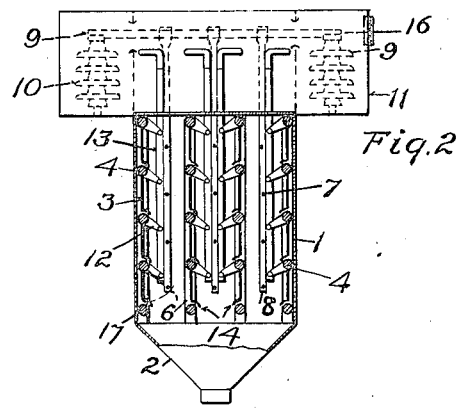
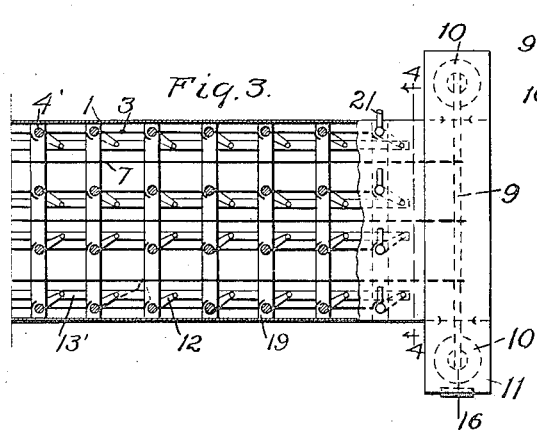
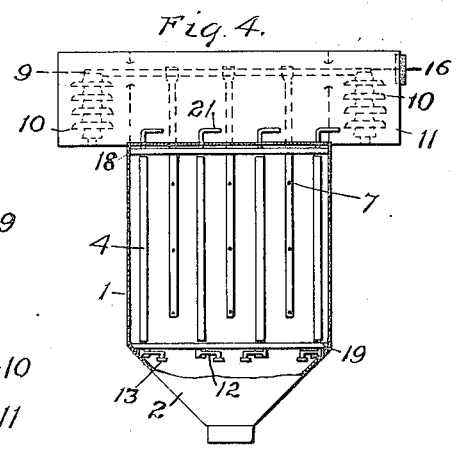
INVENTOR.
Charles H. Weiskopf
BY Arthur P. Knight
ATTORNEY.

May 27, 1924. 1,495,363
C. H. WEISKOPF
APPARATUS FOR ELECTRICAL PRECIPITATION OF SUSPENDED PARTICLES FROM GASES
Filed Dec. 8, 1920 2 Sheets-Sheet 2
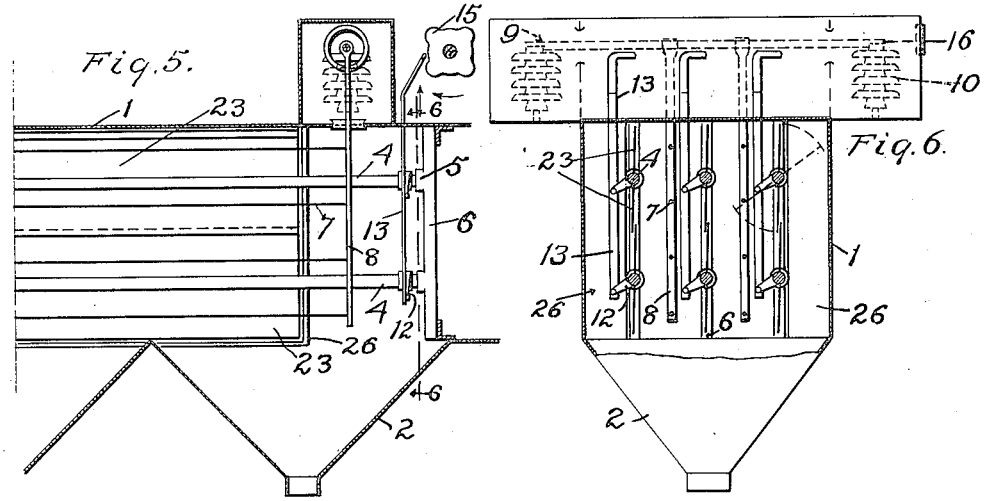
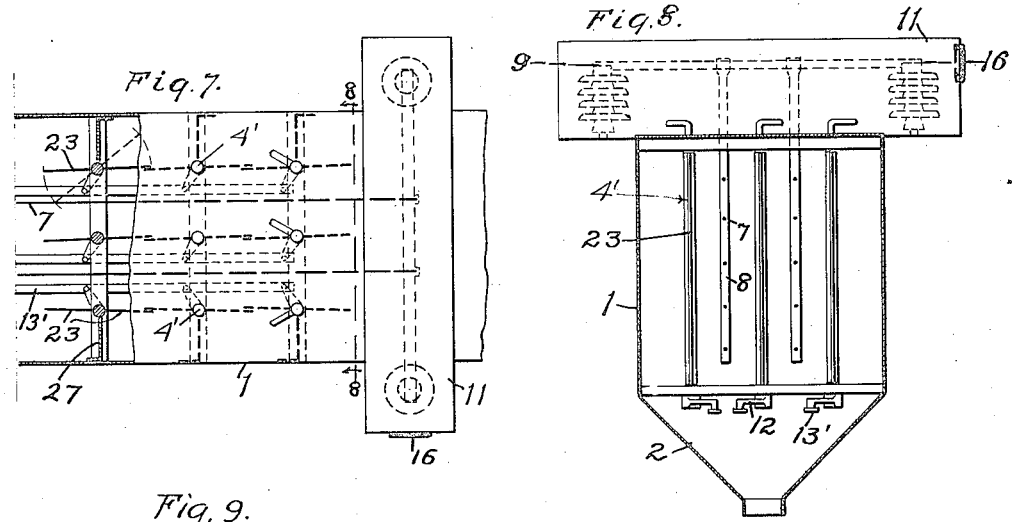
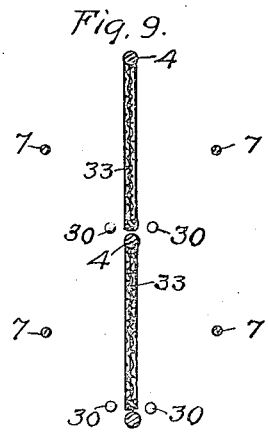
INVENTOR.
Charles H. Weiskopf.
BY Arthur P. Knight
ATTORNEY.

Patented May 27, 1924.

1,495,363

UNITED STATES PATENT OFFICE.

CHARLES H. WEISKOPF, OF SANTA MONICA, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL PRECIPITATION OF SUSPENDED PARTICLES FROM GASES.

Application filed December 8, 1920. Serial No. 429,258.

*To all whom it may concern:*

Be it known that I, CHARLES H. WEISKOPF, a citizen of the United States, residing at Santa Monica, in the county of Los Angeles and State of California, have invented a new and useful Apparatus for Electrical Precipitation of Suspended Particles from Gases, of which the following is a specification.

This invention relates to the art of electrical precipitation of suspended material from gases. Electrical precipitators as generally constructed comprise discharge electrodes and collecting electrodes in opposed relation and maintained at high potential difference, the collecting electrodes generally being grounded and the discharge electrodes being insulated and maintained at high potential and so constructed as ot provide for electrical discharge therefrom.

The main object of the invention is to provide such an apparatus with improved electrode means of such construction that the electrodes themselves may operate as jarring devices for cleaning the electrodes.

A further object of my invention is to provide for utilizing the collecting electrodes as means for jarring the discharge electrodes, the collecting electrodes being movably mounted so that by moving the same from time to time they may be brought suddenly against a fixed arresting means to jar the collected material from the collecting electrodes, or may be brought suddenly against the discharge electrodes to jar the same and remove collected material therefrom.

The accompanying drawings illustrate embodiments of my invention, and referring thereto:

Fig. 1 is a longitudinal section of an electrical precipitator of the horizontal flue type provided with my improved electrode means, the collecting electrodes being mounted to move on horizontal axes;

Fig. 2 is a vertical section on line 2—2 in Fig. 1;

Fig. 3 is a plan view of another form of the invention with a part of the top removed, the collecting electrodes in this form of the invention being mounted to move on vertical axes;

Fig. 4 is a vertical section on line 4—4 in Fig. 3;

Fig. 5 is a longitudinal section of another form of the invention in which the collecting electrodes are mounted in balanced relation on horizontal axes;

Fig. 6 is a vertical section on line 6—6 in Fig. 5;

Fig. 7 is a plan view, partly in horizontal section, of a form of the invention in which the collecting electrodes are mounted in balanced relation on vertical axes;

Fig. 8 is a vertical section on line 8—8 in Fig. 7;

Fig. 9 is a vertical section showing another modification.

The form of the invention shown in Figs. 1 and 2 comprise a horizontal flue or chamber 1 through which the gases are passed longitudinally by any suitable connections to receive and discharge the gases from said flue or chamber, said flue or chamber being provided, if desired, with suitable means, such as bins 2, at the bottom of the flue or chamber for receiving the collected material.

The collecting electrodes in this form of the invention consist of vertical plates 3 mounted within said flue or chamber 1 on horizontal shafts or rods 4, which are mounted to turn in bearings 5 on standards, as shown at 6 in Fig. 1, which shows only one end of the precipitator; it being understood that standards similar to the standards 6 shown are provided at the other ends of the shafts 5 for supporting the same. Each plate 3 normally hangs vertically from its supporting shaft 4 and the several plates 3, which are mounted on the same standard, normally extend in the same vertical plane so as to form in effect an approximately continuous vertical surface member constituting a collecting electrode, the several collecting electrodes so formed being spaced apart to form horizontal passages between them through which the gas flows the said electrode members in normal position extending parallel to the flow of the gases through the flue or chamber 1 so that the gases pass between and parallel to the electrodes. The discharge electrodes 7 may consist of wires, rods or tubes extending within the flue or chamber 1, between and in opposed relation to the collecting electrodes above described. Said discharge electrodes may extend in any direction parallel to the general surface of the collecting electrodes but they are herein shown extending horizontally, being mounted at their ends on vertical frame bars 8, which are hung from cross-frame bars 9 mounted on insulators 10 in an insulator box 11, only one of such cross-frame bars and insulator boxes being herein shown; it being understood that the other ends of the discharge electrodes will be similarly supported.

Means are provided for operating the collecting electrode plates 3 so as to cause them to turn on horizontal axes. For this purpose, the supporting shafts 4 for said plates may be provided with arms 12 pivotally connected to vertical bars 13 which extend outside of the precipitator casing and are provided with suitable means for manual or mechanical operation thereof, an operating cam 15 being, for example, provided to lift the bars 13 automatically at definite intervals to cause the shafts 4 to turn in such manner as to swing the collecting electrode plates 3 laterally towards the discharge electrodes and then allow them to drop, so that they are returned under the action of gravity to vertical position. Each collecting electrode plate 3 is preferably provided with a lug or flange means 14 adapted to engage the shaft 4 of the next underlying plate, or, in the case of the lowermost plate, to engage a stationary rod 17, to jar the said plate as it returns to normal vertical position. The plate members 3 are preferably so spaced and constructed that when they are raised in this manner they will strike the opposed discharge electrodes 7, it being understood that provision is made for turning off the high potential current supply to the discharge electrodes when this operation is taking place.

The discharge electrode system is connected by wire 16 to any suitable high tension electrical circuit, preferably uni-directional, as set forth, for example, in patent to F. G. Cottrell, No. 895,729, August 11th, 1908.

The operation of this form of the invention is as follows:

The gas to be treated, which may be furnace gases, or other gases carrying dust or fume, passes through flue 1 and is subjected to the action of the electrical field maintained between the discharge electrodes 7 and the collecting electrode members 3, with the result that the dust or fume is collected on the electrodes. From time to time the current supply from the high tension circuit is shut off and the electrode members 3 are operated by the automatic means 15, or manually, as may be preferred, to move or swing said members 3 upwardly and laterally, as indicated in dotted lines, in the case of the lowermost left hand member 3 in Fig. 2, causing said members 3 to strike the discharge electrodes 7 and thereby jar or shake off material collected thereon. When the collecting electrode members 3 return to normal position under the action of gravity the flanges 14 thereon strike the arresting members or stop means 4 or 17 and cause jarring of the collecting electrodes, and the jarring thus produced in the operation and return movements of the collecting electrode members 3 causes the material collected thereon to be shaken loose or dislodged. The material recovered from the collecting and discharge electrodes, as above described, falls by gravity to the bins 2 from which it may be withdrawn as required.

As shown in Figs. 3 and 4, the shafts 4' of the collecting electrode members may extend vertically and be mounted to turn in frame bars 18 and 19 and may be operated positively in both operating and return movements, for example, by handle means 21 on one of the vertical shafts 4' said shafts being connected to move in unison by bars 13' connected to arms 12 on said shafts, the construction and operation being otherwise as above described. This form of the invention has the advantage that in the cleaning operation the pivoted electrode members are swung to positions in which they extend transversely to the flow of gases through the precipitator, thereby slowing down the gas stream and rendering the cleaning more effective, there being less tendency for the dislodged material to be carried forward with the gas stream.

Instead of forming the collecting members as wings or plates extending in one direction only from the supporting shafts, the collecting electrodes may, as shown in Figs. 5 and 6, be formed as plates or wings 23 extending both above and below the horizontal shafts 4 carrying the same so as to balance the weight, these plates overlapping, as shown, when in vertical position so as to jar one another when returned to such position. In this case the plates 23 may be returned to normal position by the weight of the operating bars 13. A similar double plate or wing construction may be used in conjunction with a vertical shaft connection, as illustrated in Figs. 7 and 8, the plates being balanced on vertical shafts 4'. With the double wing construction illustrated in Figs. 5 to 8, it is desirable to provide baffle means, as indicated at 26 in Figs. 5 and 6 and at 27 in Fig. 7, to prevent the gas from passing back of the other series of collecting electrode plates. The construction and operation of the apparatus illustrated in Figs. 5 to 8 are similar, except as above noted, to that of the apparatus shown in Figs. 1 to 4.

While it is preferred to operate the above described apparatus so as to jar both the collecting and discharge electrodes, it is possible to operate the collecting electrodes by swinging them back and forth through a small angle without striking or closely approaching the discharge electrodes, and in such operation they may be brought suddenly against the stop means described, to jar the electrodes, or the striking action due to lateral movement or vibration of the electrodes may, in some cases, be depended on to remove the collected material therefrom. Stop means may be arranged, as shown at 30 in Fig. 9, so as to arrest the collecting electrodes on this outward swinging movement to produce a jarring action. The collecting electrode plate member 3 may be formed of sheet metal or of wire screen material, held in a suitable frame, as indicated at 33 in Fig. 9, and the term "plate member," as applied to the collecting electrodes, is to be understood as including such a screen construction.

What I claim is:

1. An apparatus for electrical precipitation of suspended material from gases, comprising a gas receiving chamber adapted for flow of gas therethrough, collecting electrode means mounted in said chamber and comprising a plurality of pivoted plate members normally extending in planes substantially parallel to each other and to the flow of gas through said chamber, and adapted to swing laterally, and discharge electrodes mounted and insulated in said chamber and extending between said collecting electrode means normally parallel thereto.

2. An apparatus for electrical precipitation of suspended material from gases comprising a gas receiving chamber adapted for flow of gas therethrough, a plurality of collecting electrode means extending in said chamber substantially parallel to one another and to the direction of flow of the gas through said chamber, each of said collecting electrode means comprising a series of pivoted plates normally extending in the same plane and adapted to swing laterally, so as to extend transversely to the flow of gas through the said chamber and discharge electrodes mounted and insulated in said chamber and extending between said collecting electrode means normally parallel thereto.

3. An apparatus for electrical precipitation of suspended material from gases, comprising a collecting electrode and a discharge electrode, means for pivotally supporting the collecting electrode to permit angular movement thereof against the discharge electrode and means for effecting such angular movement.

4. An apparatus for electrical precipitation of suspended material from gases, comprising a collecting electrode having an extended surface, a discharge electrode extending parallel thereto, means for pivotally supporting the collecting electrode to permit angular movement thereof against the discharge electrode and means for effecting such angular movement.

5. An apparatus for electric precipitation of suspended material from gases, comprising a plane collecting electrode, a discharge electrode extending parallel thereto, means for pivotally supporting the collecting electrode to permit angular movement thereof against the discharge electrode and means for effecting such angular movement.

6. An apparatus for electric precipitation of suspended material from gases, comprising a plurality of collecting electrode plates normally disposed in parallel relation, discharge electrodes between the plates, means for pivotally supporting the plates to permit angular movement thereof against the discharge electrodes and means for effecting such angular movement.

7. An apparatus for electric precipitation of suspended material from gases, including a collecting electrode consisting of a plurality of plates normally disposed substantially in a single plane and forming a substantially continuous surface, means for pivotally supporting each plate to permit angular movement thereof out of said plane and means for effecting such angular movement.

8. An apparatus for electric precipitation of suspended material from gases, comprising a collecting electrode consisting of a plurality of plates normally disposed in a single plane and forming a substantially continuous collecting surface, means for pivotally supporting each plate to permit angular movement out of the plane, means for effecting such movement and a discharge electrode disposed parallel to said plane in the path of movement of at least one of said plates.

9. An apparatus for electric precipitation of suspended material from gases, comprising a collecting electrode consisting of a plurality of plates normally disposed in a single plane and forming a substantially continuous collecting surface, means for pivotally supporting each plate to permit angular movement out of the plane, means for effecting such movement and a discharge electrode disposed parallel to said plane in the path of movement of all said plates.

10. An apparatus for electrical precipitation of suspended material from gases, comprising a gas receiving chamber, collecting electrode means in said chamber comprising a plurality of pivoted plate members, normally extending in the same vertical plane and adapted to swing laterally, and discharge electrode members extending parallel to such vertical plane and in position to be struck by the said collecting electrode plate members when swung laterally.

11. In an electric precipitator, a plurality of plates normally disposed in substantially a single plane and forming a substantially continuous collecting surface, means for pivotally supporting each plate for permitting angular movement thereof out of the plane, and means for effecting such angular movement, the plates being constructed and arranged to contact with one another in their normal position.

12. In an electric precipitator, a plurality of plates normally disposed above each other in a vertical plane and forming a substantially continuous collecting surface, means for pivotally supporting each plate at its upper edge for permitting angular movement out of the said plane and means for effecting such angular movement.

13. In an electric precipitator, a plurality of plates normally disposed above each other in a vertical plane and forming a substantially continuous collecting surface, means for pivotally supporting each plate at its upper edge for permitting angular movement out of the said plane and means for effecting such angular movement, the plates being constructed and arranged to contact with one another in their normal position.

14. In an electric precipitator, a plurality of plates normally disposed above each other in a vertical plane and forming a substantially continuous collecting surface, means for pivotally supporting each plate at its upper edge for permitting angular movement out of the plane and means for effecting simultaneous angular movement of all the plates.

In testimony whereof I have hereunto subscribed my name this 29th day of November, 1920.

CHARLES H. WEISKOPF.